April 6, 1948.　　G. WÜNSCH ET AL　　2,438,957
RUDDER MACHINE FOR AUTOMATIC PILOTS
Filed Nov. 20, 1940　　3 Sheets-Sheet 1

INVENTORS
GUIDO WÜNSCH,
BRUNO WEINKAUFF,
WALTER SADOWSKI and
HERBERT KOBISCHKE
BY
ATTORNEY

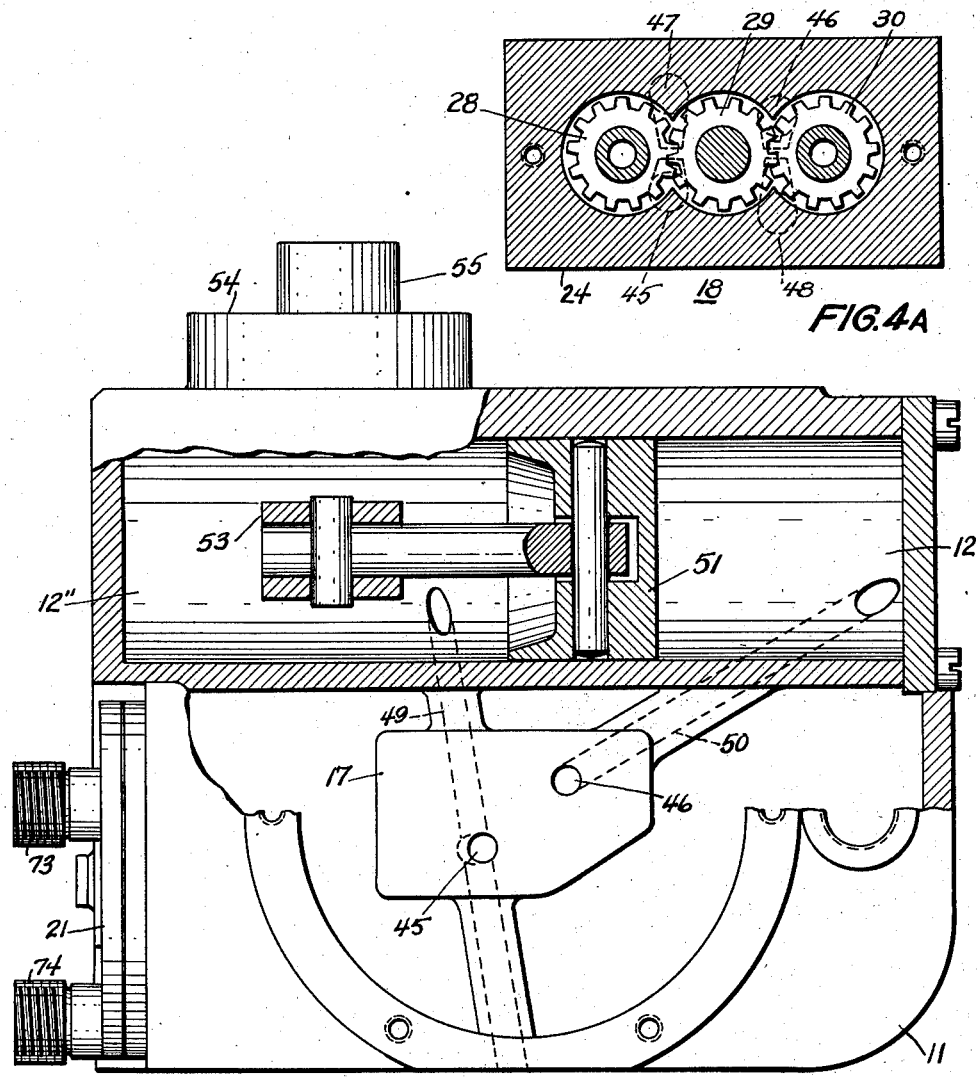

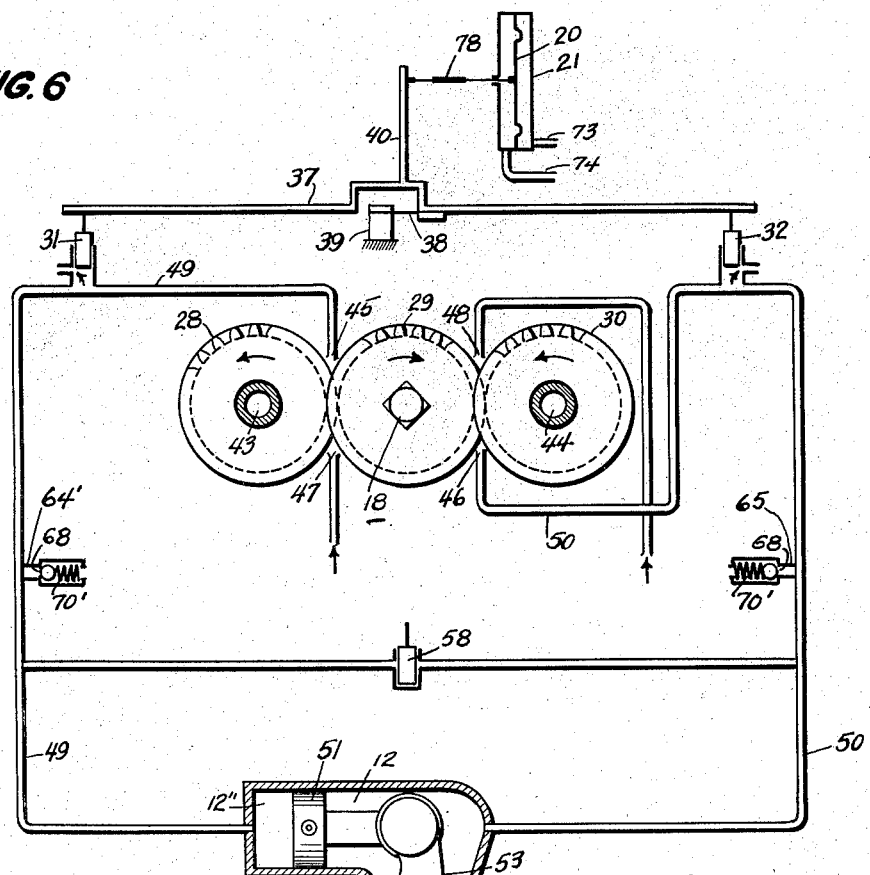
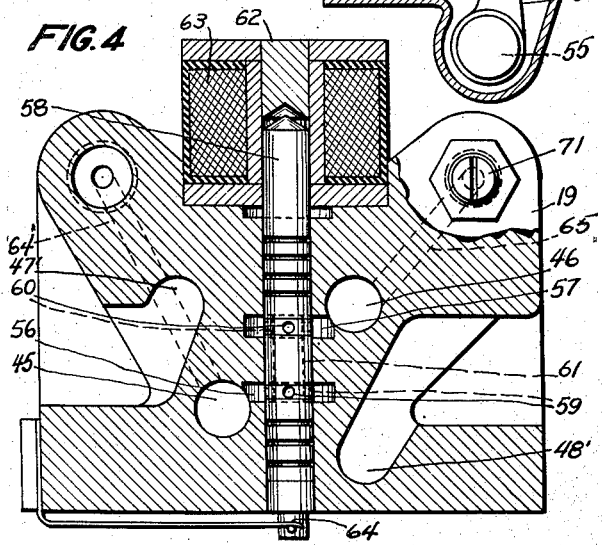
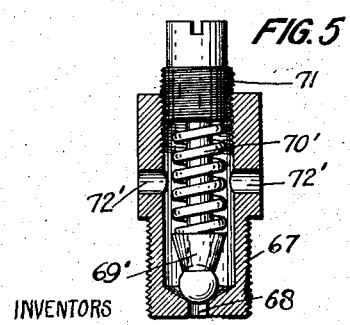

Patented Apr. 6, 1948

2,438,957

UNITED STATES PATENT OFFICE 2,438,957

RUDDER MACHINE FOR AUTOMATIC PILOTS

Guido Wünsch, Bruno Weinkauff, Walter Sadowski, and Herbert Kobischke, Berlin, Germany; vested in the Attorney General of the United States Application November 20, 1940, Serial No. 366,364
In Germany December 22, 1937

4 Claims. (Cl. 103—41)

This invention relates to improvements in automatic pilots of the hydraulic type, especially adapted for aircraft. More especially, the invention relates to a compact unitary combining in a single casing of a motor driven pump, relay valve, and servo motor, whereby no hydraulic piping need be employed outside of the unit. A separate unit of identical type may be employed for each axis of these aircraft. It is preferred to employ as the pump a double acting gear pump of known design which simultaneously circulates fluid in opposite directions through two lines leading to the servo motor, in which the pressure is varied on the servo motor by differentially and practically continuously varying the pressure of a portion of the fluid in the two lines. For this purpose valves are preferably located within the collared shafts of the gear pump itself, whereby friction is reduced to a minimum. It is also proposed to eliminate backlash in the connections by employing wire links connected to the stems of the valves and adjustably connected to a rocker shaft or lever which is controlled by the governing impulses from the position maintaining device, such as a directional gyroscope or artificial horizon.

Further improvements accomplished by the invention will be apparent from the following description and claims.

Referring to the drawings, illustrating one form the invention may assume,

Fig. 2 is a horizontal section through the bottom of the case, showing the servo piston.

Fig. 3 is a sectional detail of one of the valves and wire stems therefor.

Fig. 4 is a section taken approximately on line 4—4 of Fig. 1, showing the manually controlled bypass valve.

Fig. 4A is a section taken along line 4A—4A of Fig. 1, showing the pump construction.

Fig. 5 is a sectional detail of an automatic relief valve, permitting overcontrol.

Fig. 6 is a diagram illustrating the operation of the pump and circulating liquid.

Figure 1:
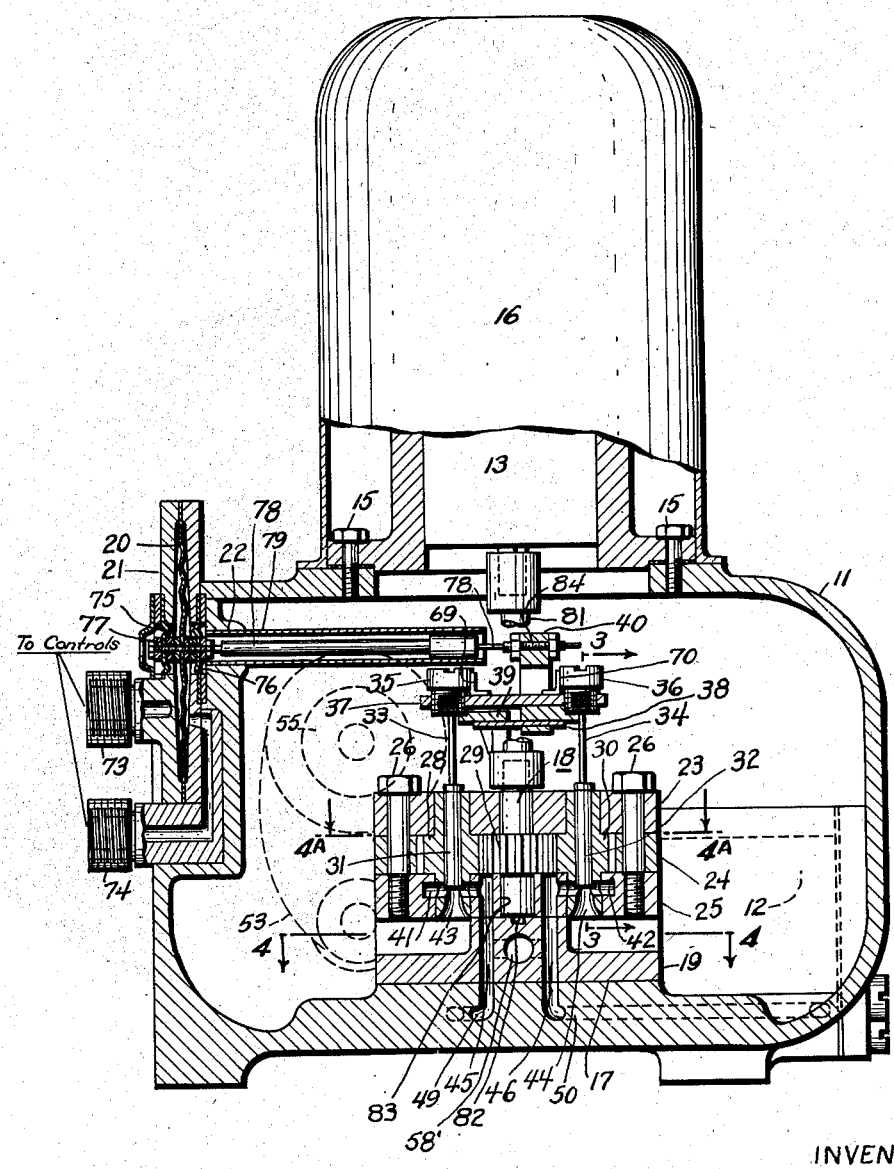
Fig. 1 is a side elevation, partly in section, of our improved combined motor driven pump, relay valve and servo motor.

The housing of the unit is a casting preferably having integral therewith the servo motor cylinder 12 and the crank housing 11. On top of the open part of the housing 11 the electric motor 13 is mounted by a flange which fits the ring-shaped extension of the housing 11 and is connected to the same by means of bolts 15. An outer cover 16 may be fitted over the electric motor in order to protect it.

The housing is filled with oil to just below the pipe 19, the purpose of which will be explained hereinafter. The oil pump 18 is mounted on a machined surface 17 of the housing 11 by means of a spacer 19. The control of the pump is effected by a differential pressure membrane 20, whose housing 21 is attached to the casing 11 from the outside, and whose transmission linkage projects through the housing wall at 22. The differential pressure acting upon membrane 20 is generated by one or more control instruments provided with pneumatic transmission systems responsive to steering impulses caused by change of course, speed of change of course, and angular acceleration around the vertical axis of the aircraft in the case of an automatic steering device. Such a transmitting instrument is described in the copending application of Adam Kronenberger for Automatic steering device for aircraft, Serial No. 312,691, filed January 6, 1940, now Patent No. 2,382,727, August 14, 1945, and in the application of Guido Wünsch, Adam Kronenberger and Karl Bauer for Angular rate gyroscope for automatic steering, Serial No. 312,692, filed January 6, 1940, now Patent No. 2,345,169, March 24, 1944.

The oil pump 18 consists of three plates 23, 24 and 25 which are assembled by means of screws 26. The metal plate 24 has openings for three gears 28, 29 and 30, the middle gear being driven by the electric motor 13 to which it is connected by means of a coupling 81, only the ends connected to the motor and to the pump being shown in the drawing. As it is not difficult to line up the motor with the axis of the gear 29, the coupling may be made rigid.

The two driven gears 28 and 30 have hollow shafts and contain small piston valves 31 and 32. Said valves are connected to spring wires 33 and 34 and are adjustable in their position by screws 35 and 36 to which the wires are secured. The screws are mounted in a plate 37 which is pivoted by means of a leaf spring 38. The other end of the leaf spring is connected to a bracket 39 on the pump. The plate 37 carries an arm 40 to which the linkage 77 and 78 of the membrane 20 is connected.

The bores in which the valves 31 and 32 operate open into annular recesses 41 and 42, respectively. These recesses communicate with the pump outlet conduits 45 and 46, and are formed in the pump plate 25, the recesses opening in turn into flared overflow openings 43 and 44, respectively, which are formed in the pump gear shafts and which communicate with the interior of the housing. The flared openings 43 and 44 communicate with the annular recesses through openings in the sides of the pump gear shafts. The valves 31 and 32, which are provided to modify or cut off overflow of liquid under pressure from the conduits 45 and 46 through the overflow openings 43 and 44 for controlling the servo motor, are normally retracted in open position so that, as shown in Figures 1 and 3, the lower ends of the valves do not shut off the side openings in the pump gear shafts and free overflow of liquid under pressure from the pump output conduits 45 and 46 can take place. When either of the valves 31 and 32 is depressed below the open positions shown, overflow from the related pump output conduit is correspondingly reduced or stopped.

The preferred construction for securing the wires 33 and 34 at both ends is shown in Fig. 3. Each of the piston valves 31 and 32 is provided with a threaded hole at the top to receive a slotted and drilled plug 64″ into which the wires 33 and 34 are inserted, bent over (see Figure 3), and soldered or welded in place. The upper ends of the wires are inserted and secured in similar screw plugs 65 and 66 which are secured within the screws 35 and 36, which are preferably knurled on the outside, and which may be closed at the top by means of screw plugs 71 and 72. Screws 35 and 36 may be secured against accidental movement by means of springs 69 and 70.

Because of the turning of gears 28, 29 and 30, oil is sucked from recesses 47′ and 48′ of spacer 19 through the holes 47 and 48 in the lower plate 25 and is forced into the passages 45 and 46 (Figs. 1 and 2). These passages, as shown in Figs. 1 and 6, lead into passages 49 and 50 which are connected to the servo motor cylinder 12 and the servo motor crank housing 12″, respectively, thereby carrying oil to opposite sides of the servo motor piston.

Normally, the two valves 31 and 32 have the open positions shown in Fig. 1, in which the oil forced into the passages 45 and 46 can flow out of the openings 43 and 44 practically without resistance. If, however, because of a steering impulse, the crank 40 is tilted and thereby one of the two piston valves 31 and 32 is moved downwardly, the cross section of the corresponding overflow opening is restricted and, as a result, pressure will increase in the corresponding one of the passages 49 and 50 which causes an increase in pressure at the corresponding side of the piston of the servo motor. This pressure against the piston 51 is transmitted to the crank 53 and results in a turning motion of the shaft 55 pivoted in an extension 54 of the housing. By attaching a coupling to this shaft, the servo motor may be connected to operate the rudder or other control element of the craft.

The motion of the pistons 31 and 32 within the shafts of the gears 28 and 30 is practically without any friction since the oscillating motion of the pistons is superimposed upon the turning motion of the gears, and since good lubrication is always provided due to the fact that the pump runs completely under oil. In order to prevent back pressure against the pistons 31 and 32 while the oil escapes from the openings 43 and 44, these openings are flared, as shown in Figures 1 and 3, to facilitate the escape of the oil.

According to the invention, the pump 18 is directly attached to the machined surface 17 of the housing 11 by means of the spacer 19 which provides for the by-pass or shunt across the two sides of the servo motor without any outside piping.

Fig. 4 shows a horizontal section through the middle of the by-passing valve. The passages 45 and 46 are connected to corresponding annular spaces 56 and 57. The spaces 56 and 57 and the passages 45 and 46 are disconnected when the piston 58 is in its normal position corresponding to a closed position of the by-pass valve. The piston is provided with lateral ports 59 and 60 which are connected to each other by a bore 61 extending axially of the piston. The upper end of the piston, which is made of magnetic material, projects into the solenoid core, which is wound with a coil 63. This coil is so connected to the electric motor 13 that the coil is energized when the motor operates. When energized the solenoid pulls the piston 58 out of the position shown in Figure 4 and into the coil against the resistance of a leaf spring 64, thereby unregistering the piston ports 59 and 60 with the annular spaces 56 and 57. The passages 45 and 46 are thereby disconnected from each other, and motion of the control valves 31 and 32 can result in an increase in fluid pressure in one or the other side of the fluid circuit, which will result in motion of the servo-motor piston 51 as previously described. In order to limit this pressure, relief valves are connected to the passages 45 and 46 by means of the passages 64′ and 65 in the spacer 19 (Fig. 4). Fig. 5 shows one of the two valves in detail.

Each relief valve housing has on the outside a thread 67 by means of which it is screwed into the spacer 19. A port 68 in the lower end of the housing affords the connection to the passages 65 or 64′, as the case may be. The port 68 is kept closed by a valve 69′ as long as the oil pressure in the corresponding one of the conduits 49 and 50 does not overcome the tension of the spring 70′, which may be adjusted by means of the screw plug 71. Such oil as escapes through the relief valves flows through the ports 72′ back into the unit housing. In order not to restrict the entrance of the oil into the intake conduits 47 and 48, the spacer 19 is hollowed out at 47′ and 48′, as shown in Figure 4. Between the lower pump plate 25 and the spacer element 19 there is provided a channel 82 (Fig. 1) which serves the purpose of carrying away the oil under pressure which might otherwise seep along the passage 83 due to slight leakage through drive gear bearings of the pump. In this way no one-sided pressure on the lower part of the shaft of the driven gear 29 can accumulate, which might press the gear upwardly against plate 23 and cause undesirable friction.

The connections 73 and 74 to the diaphragm housing 21 are shown in Fig. 2 as being located in one plane. This is done in order to better show their construction. As shown in Fig. 1, the connections are actually located to the right and left of the diaphragm. It has been already stated herein that the diaphragm is attached to the outside of the housing 11 and that the connecting linkage projects through the wall into the inside of the housing. In order to keep the housing tight against the diaphragm casing, two small soft membranes 75 and 76 are provided which are rigidly connected to the diaphragm 20, which is preferably made of metal. The connection is secured by nuts threaded on one end of a pin 77. The other end of the pin carries a spring wire 78 which terminates in a little screw 84 which effects the connection with the crank 40.

In order that the metal diaphragm 20 can move without restriction, the small auxiliary membranes 75 and 76 are made loose enough so as not to counteract the motion of the membrane 20. In the present design the pressure in the pipe lines 73 and 74 is kept below atmospheric pressure, so that the outer atmospheric pressure tends to push the membranes 75 and 76 into the housing 21. If pressure greater than atmospheric pressure is to be used in the lines 73 and 74, the membranes should be formed in the opposite way so that they bulge toward the outside. The connecting pin 77 is surrounded by the previously mentioned protecting tube 79, which serves the purpose of preventing the oil in the housing from reaching the auxiliary membrane 76.

The operation of the unit is started by closing a switch (not shown) to cause the electric motor 13 to run. The solenoid 63, which is connected in parallel with the motor, is energized at the same time and as a result the by-pass valve between the passages 45 and 46 is closed. If the airplane deviates from the desired flying course, a differential pressure is produced in the known way and influences the diaphragm 20, which causes tilting of the crank or lever 40. As explained before, this causes differential pressure in the passages 45, 46, 49 and 50 which moves the servo motor piston and causes a proportionate movement of the rudder or other control element in a direction to correct for the deviation from the set course of the aircraft.

It is possible to use the unit for desired motions of the rudder which may be controlled by a hand switch. In place of the differential pressure diaphragm 20, an electric relay or a rotary magnet may be used without deviating from the fundamental principle of the invention.

Since changes may be made in the above described construction of the invention without departing from the scope thereof, it is intended that the herein disclosed embodiments shall be interpreted as illustrative, rather than as limitative.

What is claimed is:

1. In apparatus of the character described, a double-acting gear pump comprising a driving gear and two driven gears and having two output passages, a hollow sleeve integral with and concentrically formed on each said driven gears, a valve plunger slidably engaged in the bore of each of said sleeves, an intermediate control member for oppositely operating said plungers, elastic wire links connecting the end portions of said control member with said plungers for actuating the latter, the ends of said elastic wire links being rigidly connected to said control member and said valves respectively, a leaf spring for suspending said control member intermediate its length, a pneumatic impulse receiver, and means for operating said member from said receiver.

2. In apparatus of the character described, a double-acting gear pump comprising a driving gear and two driven gears and having two output passages, a hollow sleeve integral with and concentrically formed on each of said driven gears, means including a valve piston slidably engaged in the bore of each of said sleeves for controlling the pressure in each of said output passages, an intermediate control member for oppositely operating said piston, an impulse receiver, and means for operating said member from said impulse receiver.

3. In apparatus of the character described, a gear pump comprising a driving gear and a driven gear, a hollow sleeve concentric with and driven by said driven gear, means including a valve piston slidably engaged in the bore of said sleeve for controlling the output pressure of said pump, and means for operating said piston.

4. In apparatus of the character described, a pump unit comprising a gear pump comprising a pump body containing a drive gear and two driven gears and two output conduits formed therein, the driven gears having tubular shafts one end of whose bores are open as overflow openings having communication with corresponding ones of output conduits of the pump, piston valves in the bores of the tubular shafts and operable therein for variably occluding the overflow openings, means for differentially operating said piston valves, and a by-pass passage in said pump body and an associated by-pass valve, said by-pass passage being connected between the pump output conduits, and means for operating said by-pass valve to open position to provide a circuit for the fluid discharged by the pump into said output conduits while one of the overflow openings is partly occluded by its overflow valve.

GUIDO WÜNSCH.
BRUNO WEINKAUFF.
WALTER SADOWSKI.
HERBERT KOBISCHKE.

REFERENCES CITED

The following references are of record in the file of this patent:

UNITED STATES PATENTS

| Number | Name | Date |
| --- | --- | --- |
| 2,219,645 | Bartho | Oct. 29, 1940 |
| 2,025,573 | Collingham | Dec. 24, 1935 |
| 1,873,787 | Rankin | Aug. 23, 1932 |
| 2,193,125 | Evans | Mar. 12, 1940 |
| 2,218,861 | Stumpf | Oct. 22, 1940 |
| 1,992,970 | Sperry | Mar. 5, 1935 |
| 397,919 | Hornig | Feb. 19, 1889 |
| 1,295,638 | Triggs | Feb. 25, 1919 |
| 1,467,218 | Wilmoth | Sept. 4, 1923 |
| 1,773,794 | Schneider | Aug. 26, 1930 |
| 2,255,878 | Dilley | Sept. 16, 1941 |
| 1,738,786 | McKinley | Dec. 10, 1929 |
| 428,612 | Hutchinson | May 27, 1890 |
| 2,267,215 | Ray | Dec. 23, 1941 |

FOREIGN PATENTS

| Number | Country | Date |
| --- | --- | --- |
| 19,484 | Switzerland | 1900 |
| 482,102 | Germany | 1929 |
| 412,535 | Germany | 1925 |
| 523,399 | Germany | 1931 |